United States Patent
Takahashi et al.

(10) Patent No.: US 8,081,335 B2
(45) Date of Patent: Dec. 20, 2011

(54) IMAGE PROCESSING APPARATUS, IMAGE PROCESSING SYSTEM, METHOD FOR MANAGING DATA IN THE IMAGE PROCESSING APPARATUS AND COMPUTER PROGRAM PRODUCT

(75) Inventors: Kenichi Takahashi, Osaka (JP);
Daisuke Sakiyama, Kawanishi (JP);
Yoichi Kawabuchi, Itami (JP);
Katsuhiko Akita, Amagasaki (JP);
Masahiro Kitamura, Osaka (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1056 days.

(21) Appl. No.: 11/946,519

(22) Filed: Nov. 28, 2007

(65) Prior Publication Data
US 2008/0123136 A1 May 29, 2008

(30) Foreign Application Priority Data
Nov. 28, 2006 (JP) .................. 2006-320435

(51) Int. Cl.
*G06F 15/00* (2006.01)
*G06F 15/16* (2006.01)
(52) U.S. Cl. ...................... 358/1.15; 709/227
(58) Field of Classification Search ............. 358/1.15, 358/1.14, 1.13, 1.18, 1.2, 1.9, 1.16, 402, 358/1.11, 474, 478, 1.12, 1.1; 709/227, 219, 709/225, 250, 229, 224, 202; 382/307, 232, 382/239, 314, 305; 715/202, 203, 201, 207
See application file for complete search history.

(56) References Cited

U.S. PATENT DOCUMENTS

| | | | |
|---|---|---|---|
| 2002/0169753 A1 | 11/2002 | Yoshimura et al. | |
| 2006/0033950 A1 | 2/2006 | Nakamura | |
| 2006/0114485 A1* | 6/2006 | Sato | 358/1.13 |
| 2006/0274367 A1* | 12/2006 | Yamamoto et al. | 358/1.15 |

FOREIGN PATENT DOCUMENTS

| | | |
|---|---|---|
| JP | 2000-112803 | 4/2000 |
| JP | 2000-155731 | 6/2000 |
| JP | 2004-246579 | 9/2004 |
| JP | 2004-272812 | 9/2004 |
| JP | 2005-18488 | 1/2005 |
| JP | 2005-234655 | 9/2005 |
| JP | 2005-301689 | 10/2005 |
| JP | 2006-018370 | 1/2006 |

OTHER PUBLICATIONS

Japanese Office Action mailed on Dec. 2, 2008 directed at counterpart application No. 2006-320435; 3 pages.

* cited by examiner

*Primary Examiner* — Saeid Ebrahimi Dehkordy
(74) *Attorney, Agent, or Firm* — Morrison & Foerster LLP

(57) ABSTRACT

An image processing apparatus is provided with a box data management portion that manages boxes where document files as shared data are saved, a document update detecting portion that detects an updated document file among the document files saved in boxes, an RSS data accumulating portion that stores file update data indicating identification information of the box thus detected, a date and time when the update has been performed, a user who has performed the update and updated contents, the file update data being shown in the RSS format, and an update information displaying portion that presents a user with the file update data of the document file satisfying conditions.

11 Claims, 15 Drawing Sheets

FIG. 5

```
<rdf:RDF

OMITTED

Ds {  <channel rdf:about="http//www.MFPB/info/rss.rdf">
      <title>MFPB BOX DATA UPDATE INFORMATION</title>
      <link>http://www.MFPB</link>
      <discription>BOX DATA UPDATE INFORMATION IN MFPB IS PROVIDED.</discription>
Db {  <items>
       <rdf:Seq>
         <rdf:li rdf:resource="http://www.MFPB/MODEL C SPECIFICATIONS/henkou/"/>
         <rdf:li rdf:resource="http://www.MFPB/MODEL D SPECIFICATIONS/henkou/"/>
       </rdf:Seq>
      </items>
      </channel>

Dk {  <item rdf:about="http://www.MFPB/MODEL C SPECIFICATIONS/henkou/">
       <title>CHANGE INFORMATION OF MODEL C SPECIFICATIONS</title>
       <link>http://www.MFPB/MODEL C SPECIFICATIONS/henkou/</link>
       <discription></discription>
      </item>

Dk {  <item rdf:about="http://www.MFPB/MODEL D SPECIFICATIONS/henkou/">
       <title>CHANGE INFORMATION OF MODEL D SPECIFICATIONS</title>
       <link>http://www.MFPB/MODEL D SPECIFICATIONS/henkou/</link>
       <discription></discription>
      </item>

</rdf:RDF>
```

```
<rdf:RDF

OMITTED

<channel rdf:about="http://www.MFPB/info/rss.rdf">                                    ⎫
<title>MFPB BOX DATA UPDATE INFORMATION</title>                                       ⎪
<link>http://www.MFPB</link>                                                          ⎬ Ds
<discription>BOX DATA UPDATE INFORMATION IN MFPB IS PROVIDED.</discription>           ⎪
<items>                                                                               ⎭
<rdf:Seq>                                                                             ⎫
<rdf:li rdf:resource="http://www.MFPB/MODEL C SPECIFICATIONS/henkou/"/>               ⎪
<rdf:li rdf:resource="http://www.MFPB/MODEL D SPECIFICATIONS/henkou/"/>               ⎬ Db
</rdf:Seq>                                                                            ⎪
</items>                                                                              ⎪
</channel>                                                                            ⎭

<item rdf:about="http://www.MFPB/MODEL C SPECIFICATIONS/henkou/">                     ⎫
<title>CHANGE INFORMATION OF MODEL C SPECIFICATIONS</title>                           ⎪
<link>http://www.MFPB/MODEL C SPECIFICATIONS/henkou/</link>                           ⎬ Dk
<discription>MFPB,MODEL C SPECIFICATIONS BOX,SPECIFICATIONS C1.pdf,MODIFIED,21page-10,2006/03/01:
MFPB,MODEL C SPECIFICATIONS BOX,SPECIFICATIONS C2.pdf,DELETED,10page,2006/03/10:</discription>   ⎪
</item>                                                                               ⎭

<item rdf:about="http://www.MFPB/MODEL D SPECIFICATIONS/henkou/">                     ⎫
<title>CHANGE INFORMATION OF MODEL D SPECIFICATIONS</title>                           ⎪
<link>http://www.MFPB/MODEL D SPECIFICATIONS/henkou/</link>                           ⎬ Dk
<discription>[MFPB,MODEL D SPECIFICATIONS BOX,SPECIFICATIONS D0.pdf,MODIFIED,21page-10,2006/03/01:  ⎤
MFPB,MODEL D SPECIFICATIONS BOX,SPECIFICATIONS D3.pdf,NEWLY REGISTERED,,2006/03/12]:</discription>⎦ Dt
</item>                                                                               ⎭
                                                                                      KF
</rdf:RDF>
```

| USER NAME | BOX DIRECTORY | FILE NAME | |
|---|---|---|---|
| USER A | $HOME¥MODEL A SPECIFICATIONS BOX | SPECIFICATIONSA0.pdf | RK |
| USER A | $HOME¥MODEL A SPECIFICATIONS BOX | SPECIFICATIONSA0.pdf | RK |
| USER A | $HOME¥MODEL A SPECIFICATIONS BOX | SPECIFICATIONSA0.pdf | RK |
| USER A | $HOME¥MODEL A SPECIFICATIONS BOX | SPECIFICATIONSA1.pdf | RK |
| USER A | $HOME¥MODEL A SPECIFICATIONS BOX | SPECIFICATIONSA1.pdf | RK |
| USER B | $HOME¥MODEL B SPECIFICATIONS BOX | SPECIFICATIONSB0.pdf | RK |
| ... | ... | ... | |

| NETWORK PATH TO RELATED DOCUMENT | RELATED DOCUMENT | RELATED DOCUMENT FILE NAME | |
|---|---|---|---|
| ¥¥MFPA¥MODEL B SPECIFICATIONS BOX¥ | SPECIFICATIONS | SPECIFICATIONS B1.pdf | RK |
| ¥¥MFPB¥MODEL C SPECIFICATIONS BOX¥ | SPECIFICATIONS | SPECIFICATIONS C1.pdf | RK |
| ¥¥MFPB¥MODEL D SPECIFICATIONS BOX¥ | SPECIFICATIONS | SPECIFICATIONS D0.pdf | RK |
| ¥¥MFPC¥MODEL E SPECIFICATIONS BOX¥ | SPECIFICATIONS | SPECIFICATIONS E2.pdf | RK |
| ¥¥MFPC¥MODEL F SPECIFICATIONS BOX¥ | SPECIFICATIONS | SPECIFICATIONS F0.pdf | RK |
| ¥¥MFPB¥MODEL C SPECIFICATIONS BOX¥ | SPECIFICATIONS | SPECIFICATIONS C0.pdf | RK |
| ... | ... | ... | |

FIG. 8

TBO

```
\\MFPA\MODEL A SPECIFICATIONS BOX\,SPECIFICATIONS A3.pdf
\\MFPA\MODEL B SPECIFICATIONS BOX\,SPECIFICATIONS B0.pdf
\\MFPA\MODEL B SPECIFICATIONS BOX\,SPECIFICATIONS B2.pdf
\\MFPB\MODEL C SPECIFICATIONS BOX\,SPECIFICATIONS C1.pdf
\\MFPB\MODEL C SPECIFICATIONS BOX\,SPECIFICATIONS C2.pdf
\\MFPB\MODEL C SPECIFICATIONS BOX\,SPECIFICATIONS C5.pdf
\\MFPB\MODEL D SPECIFICATIONS BOX\,SPECIFICATIONS D0.pdf
\\MFPB\MODEL D SPECIFICATIONS BOX\,SPECIFICATIONS D0.pdf
\\MFPC\MODEL G SPECIFICATIONS BOX\,SPECIFICATIONS G0.pdf
\\MFPC\MODEL G SPECIFICATIONS BOX\,SPECIFICATIONS G1.pdf
\\MFPC\MODEL G SPECIFICATIONS BOX\,SPECIFICATIONS G2.pdf
```

FIG. 9

```
MFPA,MODEL B SPECIFICATIONS BOX,SPECIFICATIONS B0.pdf,MODIFIED,31page-10,2006/03/01:
MFPB,MODEL C SPECIFICATIONS BOX,SPECIFICATIONS C1.pdf,MODIFIED,21page-10,2006/03/01:
MFPB,MODEL C SPECIFICATIONS BOX,SPECIFICATIONS C2.pdf,DELETED,10page,2006/03/10:
MFPB,MODEL D SPECIFICATIONS BOX,SPECIFICATIONS D0.pdf,MODIFIED,21page-10,2006/03/01:
MFPB,MODEL D SPECIFICATIONS BOX,SPECIFICATIONS D3.pdf,NEWLY REGISTERED,,2006/03/12:
MFPC,MODEL G SPECIFICATIONS BOX,SPECIFICATIONS G3.pdf,NEWLY REGISTERED,,2006/03/12:
```
TB1

FIG. 10A

```
TB1
MFPA,MODEL B SPECIFICATIONS BOX,SPECIFICATIONS B0.pdf,MODIFIED,31page-10,2006/03/01:
MFPB,MODEL C SPECIFICATIONS BOX,SPECIFICATIONS C1.pdf,MODIFIED,21page-10,2006/03/01:
MFPB,MODEL C SPECIFICATIONS BOX,SPECIFICATIONS C2.pdf,DELETED ,10page,2006/03/10:
MFPB,MODEL D SPECIFICATIONS BOX,SPECIFICATIONS D0.pdf,MODIFIED ,21page-10,2006/03/01:
MFPB,MODEL D SPECIFICATIONS BOX,SPECIFICATIONS D3.pdf,NEWLY REGISTERED ,,2006/03/12:
```

FIG. 10B

```
TB1
MFPB,MODEL C SPECIFICATIONS BOX,SPECIFICATIONS C1.pdf,MODIFIED ,21page-10,2006/03/01:
MFPB,MODEL D SPECIFICATIONS BOX,SPECIFICATIONS D0.pdf,MODIFIED ,21page-10,2006/03/01:
```

FIG. 11

| STORAGE LOCATION MFP | STORAGE LOCATION BOX | FILE NAME | UPDATE TYPE | UPDATED SECTION | UPDATE DATE AND TIME |
|---|---|---|---|---|---|
| MFPA | MODEL B SPECIFICATIONS BOX | SPECIFICATIONS B0.pdf | MODIFIED | 31 PAGE-10 | 2006/03/01 |
| MFPB | MODEL C SPECIFICATIONS BOX | SPECIFICATIONS C1.pdf | MODIFIED | 21 PAGE-10 | 2006/03/01 |
| MFPB | MODEL C SPECIFICATIONS BOX | SPECIFICATIONS C2.pdf | DELETED | 10 PAGE | 2006/03/10 |
| MFPB | MODEL D SPECIFICATIONS BOX | SPECIFICATIONS D0.pdf | MODIFIED | 21 PAGE-10 | 2006/03/01 |
| MFPB | MODEL D SPECIFICATIONS BOX | SPECIFICATIONS D3.pdf | NEWLY REGISTERED | – | 2006/03/12 |
| MFPC | MODEL G SPECIFICATIONS BOX | SPECIFICATIONS G3.pdf | NEWLY REGISTERED | – | 2006/03/12 |

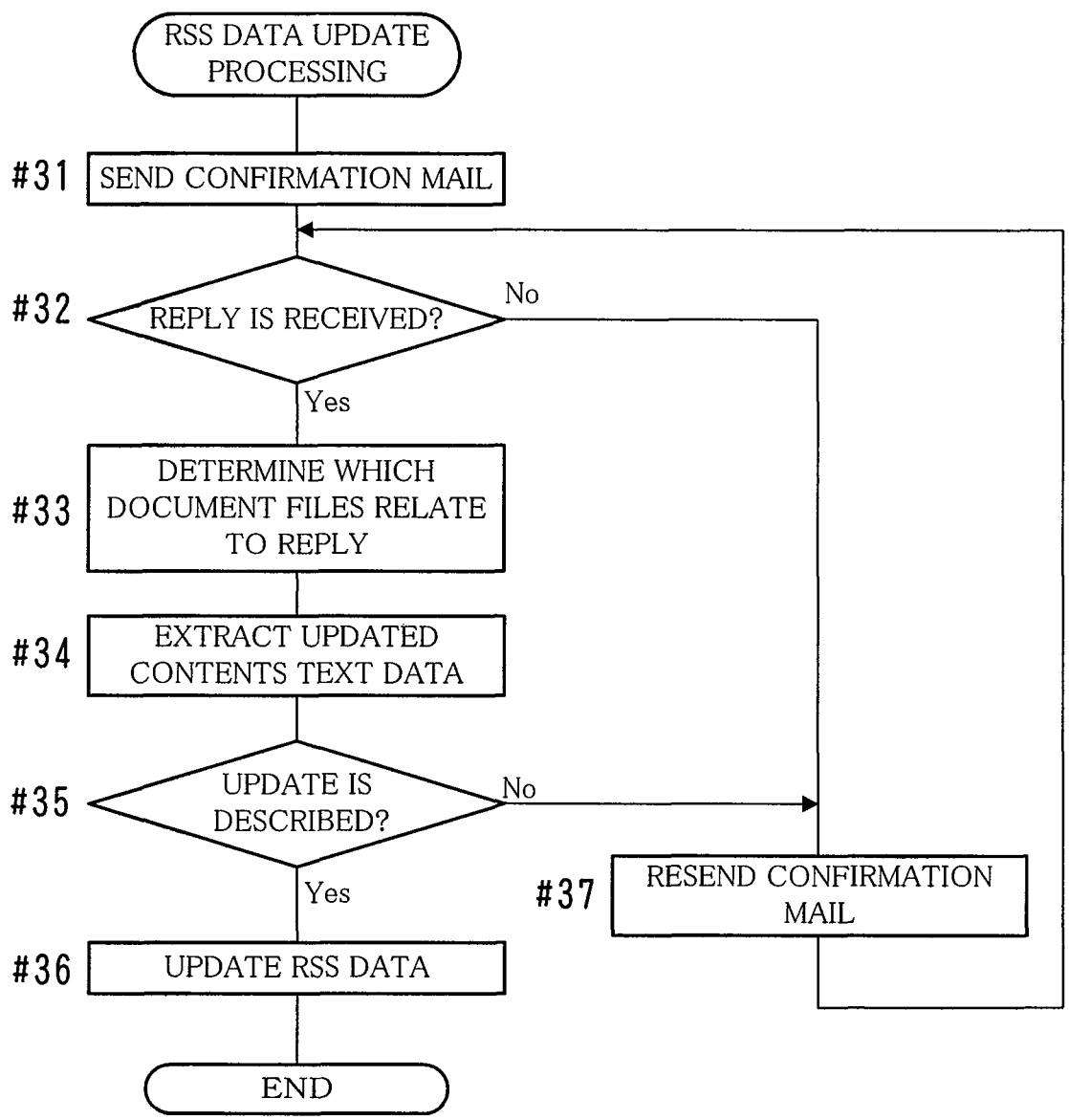

IMAGE PROCESSING APPARATUS, IMAGE PROCESSING SYSTEM, METHOD FOR MANAGING DATA IN THE IMAGE PROCESSING APPARATUS AND COMPUTER PROGRAM PRODUCT

This application is based on Japanese patent application No. 2006-320435 filed on Nov. 28, 2006, the contents of which are hereby incorporated by reference.

BACKGROUND OF THE INVENTION

1. Field of the Invention

The present invention relates to an image processing apparatus having a document server function, a method for managing data in the image processing apparatus, and others.

2. Description of the Related Art

Image processing apparatuses into which various functions including a copy function, a scanner function, a FAX function and a network printing function are integrated are prevalent in organizations such as government and corporate offices and schools. The image processing apparatuses are sometimes called Multi Function Peripherals (MFPs).

Image processing apparatuses equipped with a high-capacity hard disk drive have recently become widespread and the image processing apparatuses have recently been used as document servers. This enables a user to save in an image processing apparatus data of a document, e.g., a document file including text, diagrams, photographs or images and to use such data remotely via a communication line by operating other device, e.g., a personal computer. Besides, this enables a plurality of users to easily share data generated by an image processing apparatus.

As stated below, there are proposed two methods for sharing or updating data.

According to the first method, data management software is made to monitor a common folder for which a user has set a notification rule, and when a data file in this common folder is updated, the data management software is made to detect that and give notice to the user.

According to the second method, when a page corresponding to received document data is already present in a server table, a CPU regards it as an update of the page and reads out document data of the corresponding page and a specified high-order relevant page from the server table. In addition, the CPU compares the document data of the corresponding page with the received document data, extracts an index item of the difference therebetween and adds the extracted index item to the high-order relevant page.

In the case where a plurality of users shares data, it is burdensome for each of the users to grasp information on an update of the data. Because a user who has updated the data is required to fully report the update to other users and the other users are required to organize the report thus received. As the number of data to be shared increases, operation related to the data update becomes more troublesome and information management becomes more complicated. The possibility arises that a report on an important update may be hidden due to other report that is not related to an important update, which may be an undesirable case in terms of data management.

The first method can save the trouble for users who have updated data to send a report. The first method, however, is incapable of avoiding the trouble for users who are to receive the report and of avoiding the complication of information management. The second method is also incapable of solving these problems.

SUMMARY

The present disclosure is directed to solve the problems pointed out above, and therefore, an object of an embodiment of the present invention is to make it possible for a plurality of users to handle information on updates of data shared by the users more easily and efficiently than ever before.

According to an embodiment of the present invention, an image processing apparatus includes a shared data saving portion that saves shared data that can be shared by a plurality of users, an updated data detection portion that detects updated shared data among the shared data saved in the shared data saving portion, an update information storage portion that stores update information indicating identification information of the shared data whose update has been detected by the updated data detection portion, a date and time when the update has been performed, a user who has performed the update and updated contents, and an update information presenting portion that presents a user with the update information of the shared data satisfying conditions.

The structure described above allows users to handle information on updates of data shared by the users more easily and efficiently than ever before.

These and other characteristics and objects of the present invention will become more apparent by the following descriptions of preferred embodiments with reference to drawings.

BRIEF DESCRIPTION OF THE DRAWINGS

FIG. 5 is a diagram showing an example of an initial update information file.

FIG. 6 is a diagram showing an example of an update information file that has been updated along with an update of a document file.

FIG. 7 is a diagram showing an example of a file associated information database.

FIG. 8 is a diagram showing an example of a user associated table.

FIG. 9 is a diagram showing an example of an update information table.

FIGS. 10A and 10B are diagrams showing an example of an update information table whose details have been changed based on user designation.

FIG. 11 is a diagram showing an example of an update information table that has been organized in the form of chart for display.

FIG. 15 is a flowchart showing an example of a flow of RSS data update processing.

DESCRIPTION OF THE PREFERRED EMBODIMENTS

Figure 1:
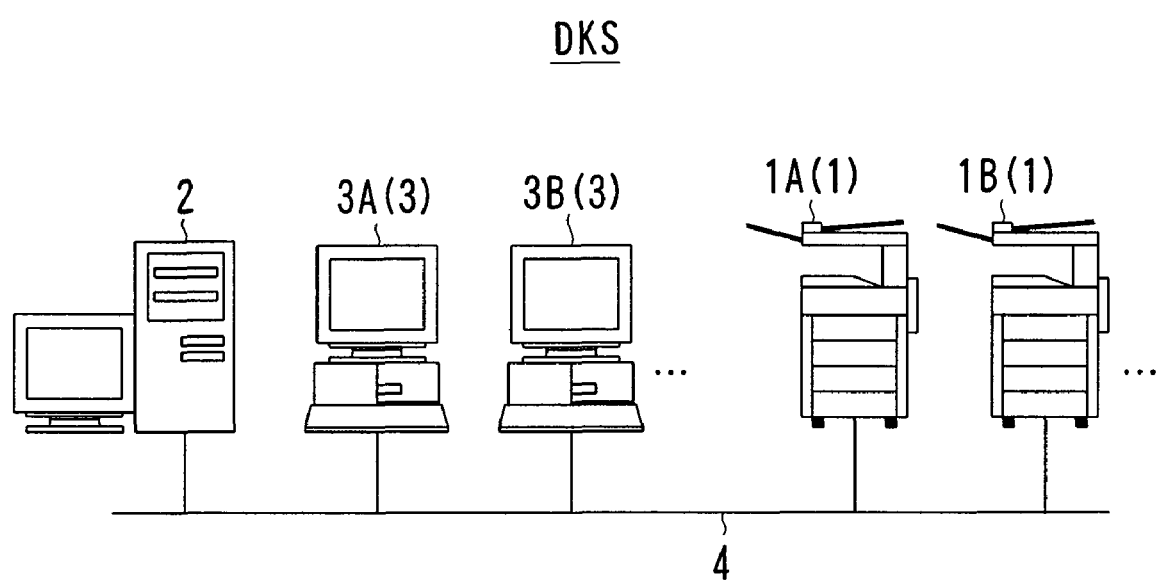
FIG. 1 is a diagram showing an example of the entire configuration of a data sharing system.

Referring to FIG. 1, a data sharing system DKS includes a plurality of image processing apparatuses 1A, 1B, . . . , a box document management server 2, a plurality of terminals 3A, 3B, . . . , and a communication line 4. The image processing apparatuses 1A, 1B, . . . , the box document management server 2 and the terminals 3A and 3B can be interconnected via the communication line 4. The communication line 4 can be a LAN line, the Internet, a public line or a dedicated line. Hereinafter, the image processing apparatuses 1A, 1B, . . . may be collectively referred to as "image processing apparatuses 1" and the terminals 3A, 3B, . . . may be collectively referred to as "terminals 3".

Each of the apparatuses is given a unique IP address. In addition, the image processing apparatuses 1A, 1B, . . . are given unique computer names, i.e., so-called host names such as "MFPA", "MFPB", . . . , respectively.

The image processing apparatus 1 is an apparatus into which various functions such as a copy function, a scanner function, a FAX function, a network printing function, a document server function and a file transfer function are integrated. The image processing apparatuses 1 are sometimes called image forming apparatuses or Multi Function Peripherals (MFPs).

The "network printing" function is a function to print an image on a sheet of paper by receiving image data from a personal computer via a communication line. This function is sometimes called a "network printer function" or a "PC print function", for example.

The "document server" function is a function to provide a storage area called, for example, a "box" or a "personal box" corresponding to a folder or a directory in a personal computer on a category basis, e.g., for each user, each group, each logic, or each file format, thereby enabling to store separately, in each storage area, document data including text, numerical expressions, symbols, photographs, diagrams or illustrations. The document server function is sometimes called a "box function".

Figure 2:
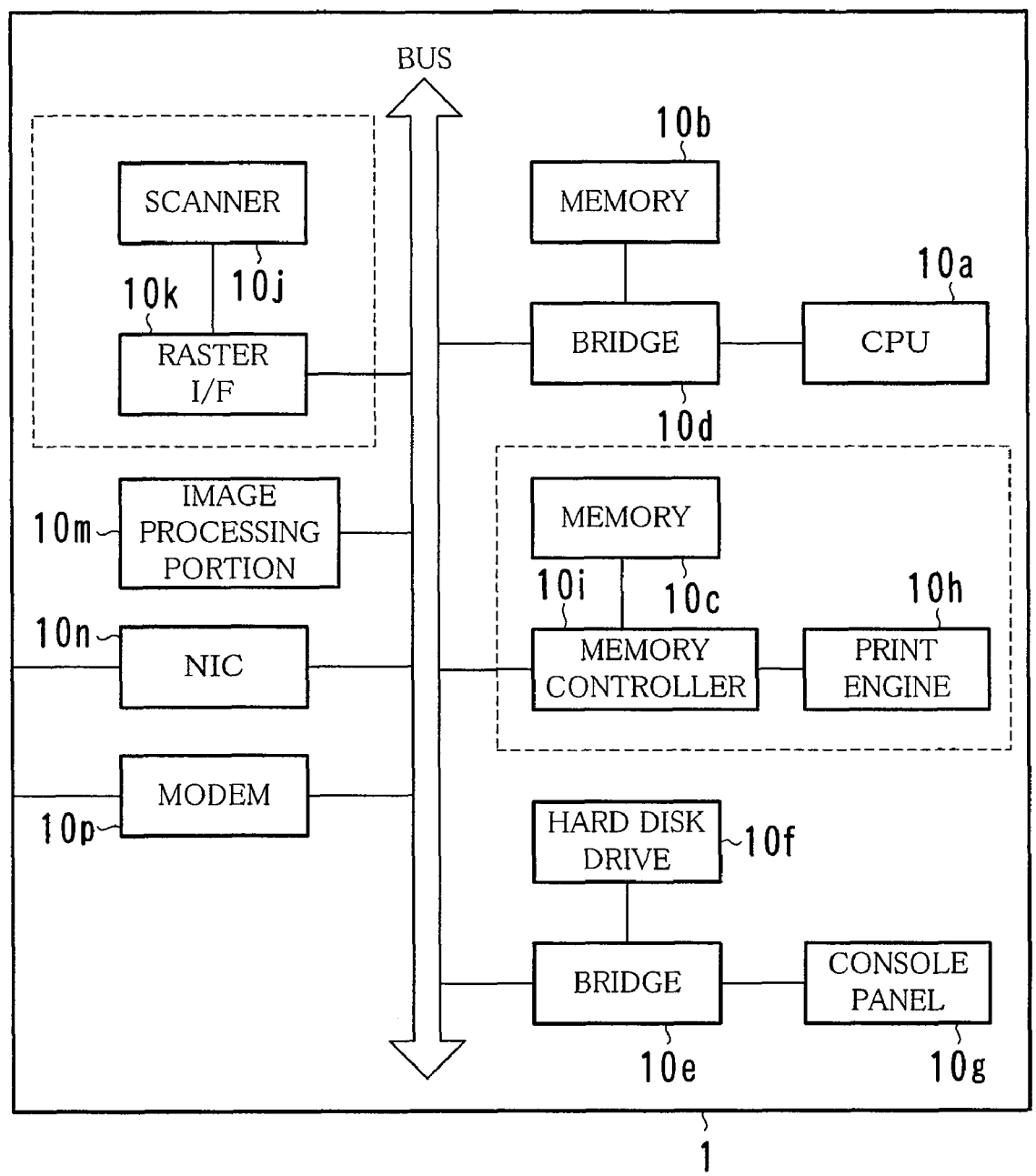
FIG. 2 is a diagram showing an example of a hardware configuration of an image processing apparatus.

As shown in FIG. 2, the image processing apparatus 1 includes a CPU 10a, memories 10b and 10c, bridges 10d and 10e, a hard disk drive 10f, a console panel 10g, a print engine 10h, a memory controller 10i, a scanner 10j, a raster interface 10k, an image processing portion 10m, a network interface card 10n and a modem 10p.

The bridge 10d controls the CPU 10a and the memory 10b. The bridge 10e controls the hard disk drive 10f and the console panel 10g. The raster interface 10k is operable to connect the scanner 10j to a bus. The memory controller 10i controls the memory 10c.

The console panel 10g is in the form of a touch panel. The console panel 10g displays a screen for providing a user with messages or instructions, a screen for the user to enter desired types of processing and processing conditions, and a screen indicating results of processing executed in the CPU 10a, for example. In addition, the user can provide commands to the image processing apparatus 1 or specify processing conditions by touching predetermined positions on the console panel 10g. Thus, the console panel 10g functions as a user interface for the user who operates the image processing apparatus 1.

The scanner 10j optically reads document images including text, numerical expressions, symbols, photographs, diagrams or illustrations that are depicted on a sheet of paper, and generates image data.

The image processing portion 10m converts an image into a bitmap image or corrects an image based on image data obtained with the scanner 10j or a print job sent from the terminal 3.

The print engine 10h prints an image on a sheet of paper based on image data that is processed by the image processing portion 10m and then is stored in the memory 10c.

The network interface card 10n is a Network Interface Card (NIC) for connecting the image processing apparatus 1 to other image processing apparatus 1, the box document management server 2 or the terminal 3 to perform communication therewith.

The modem 10p is an interface for performing data communication with a FAX terminal using a FAX protocol such as G3.

Figure 3:
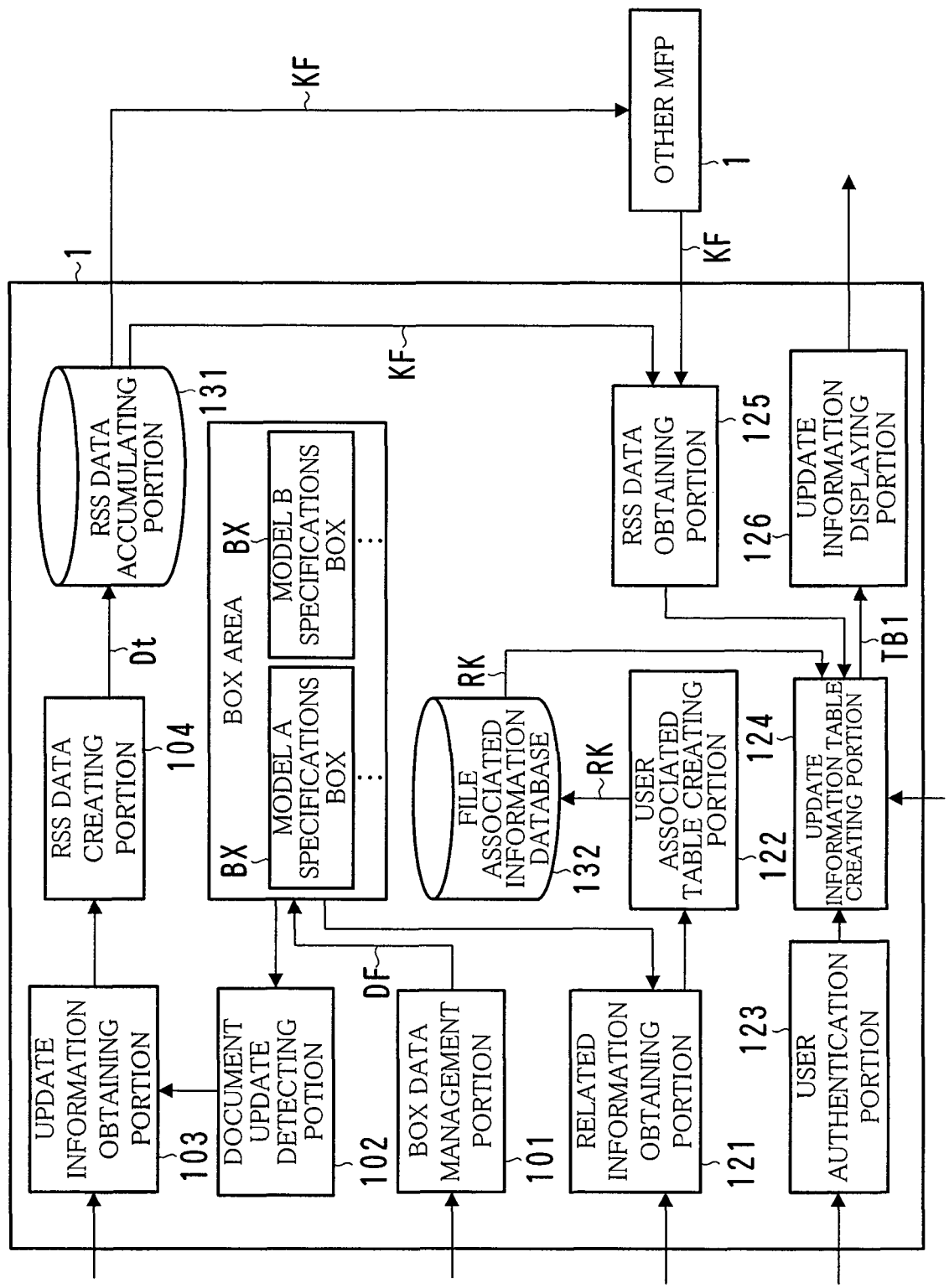
FIG. 3 is a diagram showing an example of a functional configuration of the image processing apparatus.

Referring to FIG. 3, on the hard disk drive 10f are stored a program and data for implementing functions of a box data management portion 101, a document update detecting potion 102, an update information obtaining portion 103, an RSS data creating portion 104, a related information obtaining portion 121, a user associated table creating portion 122, a user authentication portion 123, an update information table creating portion 124, an RSS data obtaining portion 125, an update information displaying portion 126, an RSS data accumulating portion 131 and a file associated information database 132. The program and data are loaded into the memory 10b as needed, and the program is executed by the CPU 10a. Some or all of the functions shown in FIG. 3 may be implemented with a circuit.

The image processing apparatus 1 enables a user to easily confirm information on an update of a file stored in a box.

The following is a description of each of the portions included in the image processing apparatus 1 shown in FIG. 3 when the data sharing system DKS is used to handle document files regarding specifications of products. In the description, the portions included in the image processing apparatus 1 are roughly classified into portions for processing for managing information on updates of files stored in boxes and portions for processing for providing information on the updates.

[Processing for Managing Information on Updates of Files Stored in Boxes]

The box data management portion 101 performs processing for reserving an area for boxes BX in the hard disk drive 10f of the image processing apparatus 1 to manage the respective boxes BX and files saved therein. The box data management portion 101 performs processing, for example, for newly saving a file in a box BX, for calling a file from a box BX based on a request made by a user, for updating or deleting a file saved in a box BX or for managing attributes of a file. Hereinafter, a file of a document concerning specifications stored (saved) in a box BX is referred to as a "document file DF".

Figure 4:
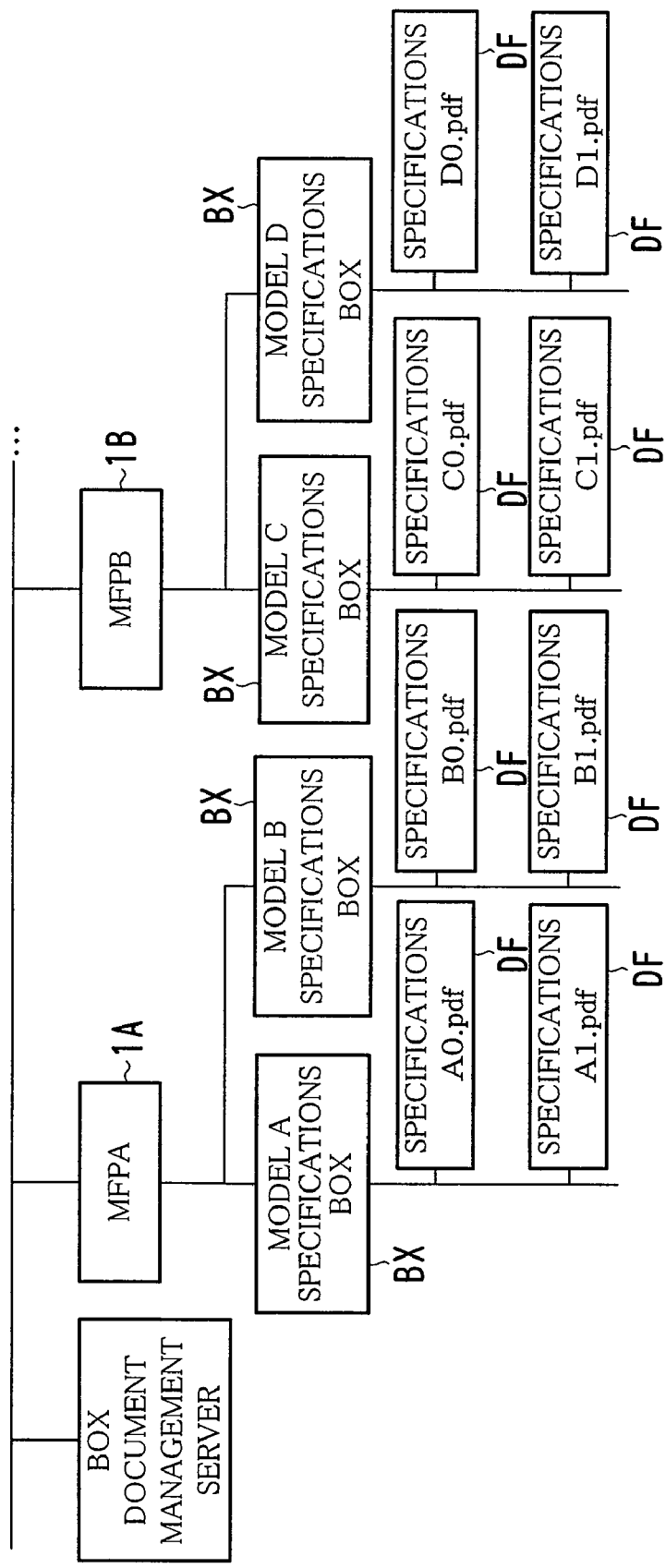
FIG. 4 is a diagram showing an example of management of boxes and files in the data sharing system.

As shown in FIG. 4, for example, boxes BX are provided in the hard disk drive 10f in each of the image processing apparatuses 1 and document files DF are saved in the boxes BX. More specifically, a box BX named "model A specifications BOX" and a box BX named "model B specifications BOX" are provided in the hard disk drive 10f of the image processing apparatus 1A. In the former are saved a document file DF named "specifications A0.pdf" and a document file DF named "specifications A1.pdf". In the latter are saved a document file DF named "specifications B0.pdf" and a document file DF named "specifications B1.pdf". Meanwhile, a box BX named "model C specifications BOX" and a box BX named "model D specifications BOX" are provided in the hard disk drive 10f of the image processing apparatus 1B. In the former are saved a document file DF named "specifications C0.pdf" and a document file DF named "specifications C1.pdf". In the latter are saved a document file DF named "specifications D0.pdf" and a document file DF named "specifications D1.pdf".

Referring back to FIG. 3, the document update detecting potion 102 detects a document file DF whose contents or attributes are updated from boxes BX provided in the image processing apparatus 1.

When the document update detecting portion 102 detects an updated document file DF, the update information obtaining portion 103 obtains information indicating the updated contents of the document file DF. The update information obtaining portion 103 obtains such information, for example, in the following manner.

The update information obtaining portion 103 sends an electronic mail including a message for requesting a report of updated contents to a user who has performed an update. Then, the update information obtaining portion 103 receives a reply in which the updated contents are described. Instead, a Common Gateway Interface (CGI) function of a Web may be used to prepare a Web page for a report of updated contents, and then a user may make a report. Differently, updated contents may be entered using the console panel log of the image processing apparatus 1. Differently, a document file DF before an update may be backed up and a difference between contents or attributes of the document file DF before the update and contents or attributes of the document file DF after the update may be determined for obtaining information on the updated contents.

The RSS data creating portion 104, for example, organizes the information on updated contents of the document file DF that is obtained by the update information obtaining portion 103 in a predetermined format. Thereby, the RSS data creating portion 104 generates file update data Dt of the updated contents of the document file DF.

Incidentally, "RSS" stands for "Rich Site Summary" (sometimes stands for "Really Simple Syndication" or "RDF Site Summary" depending on the version). The "RSS" is a format complying with XML in which metadata such as a title, a Uniform Resource Locator (URL), a headline, and a summary of a Web site are structured.

In this embodiment, the RSS is extended and the format of the file update data Dt is defined as the following format A. The RSS data creating portion 104 generates file update data Dt in accordance with the format.

Format A: Identification information of an image processing apparatus 1, identification information of a box BX, a file name of the document file DF, an update type, an updated section, date and time when an update is performed, and identification information of a user who has performed the update.

The "identification information of a box BX" is identification information (e.g., a box name) of a box BX in which the document file DF is saved. The "identification information of an image processing apparatus 1" is identification information (e.g., a host name or an IP address) of an image processing apparatus 1 in which the box BX is provided. The time section of the "date and time when an update is performed" may be omitted. The "identification information of a user" is a user name or a user ID of a user.

For example, in the case where page 21, line 10 section of a document reproduced by a document file DF, which is hereinafter referred to as a "document of a document file DF", named "specifications C1.pdf" saved in a box BX named "model C specifications BOX" provided in the image processing apparatus 1B is modified on Mar. 1, 2006, the RSS data creating portion 104 generates data having contents of "MFPB, model C specifications BOX, specifications C1.pdf, modified, 21 page-10, Mar. 1, 2006".

In addition, the RSS data creating portion 104 also generates file update data Dt of a document file DF that is newly registered (saved) in a box BX of the image processing apparatus 1.

For example, in the case where a document file DF named "specifications G3.pdf" saved in a box BX named "model G specifications BOX" is newly saved on Mar. 12, 2006, the RSS data creating portion 104 of the image processing apparatus 1D generates data having contents of "MFPD, model G specifications BOX, specifications G3.pdf, newly registered, Mar. 12, 2006".

The RSS data accumulating portion 131 accumulates data indicating updated contents of document files DF saved in boxes BX provided in the image processing apparatus 1.

Specifically, one update information file KF is prepared in advance and the RSS data accumulating portion 131 is made to store the same. The update information file KF includes data as shown in FIG. 5 or 6.

Referring to FIGS. 5 and 6, bibliographic data Ds indicates bibliographic information of the update information file KF itself, e.g., information on a title, a Uniform Resource Locator (URL) and summary description of the update information file KF.

Update detailed data Dk is given for each box BX provided in the image processing apparatus 1. The update detailed data Dk indicates details of updated contents of a document file DF saved in the box BX. In particular, a part specified in "(description)" tag is the updated contents of the document file DF. File update data Dt, which is generated by the RSS data creating portion 104, concerning the document file DF saved in the box BX are added to the part one after another. Other than the above, the update detailed data Dk indicates information such as a URL and a title for identifying the file update data Dt.

List data Db indicates a list of the update detailed data Dk included in the update information file KF.

FIG. 5 shows update detailed data Dk at the time point when no update is performed on a document file DF. However, when an update is performed and the RSS data creating portion 104 generates file update data Dt, the RSS data accumulating portion 131 adds the file update data Dt to the update detailed data Dk as shown in FIG. 6. Further, when a new box BX is generated in the image processing apparatus 1, the RSS data accumulating portion 131 updates the list data Db, generates update detailed data Dk anew and adds the generated update detailed data Dk to the update information file KF.

[Processing for Providing Information on Updates]

Referring to FIG. 7, the file associated information database 132 shown in FIG. 3 stores document-related data RK for each document file DF saved in boxes BX provided in the image processing apparatus 1.

The document-related data RK indicates a relationship between a document of a document file DF concerning the document-related data RK and a document of other document file DF. Specifically, the document-related data RK indicates information on the following items.

In FIG. 7, the "USER NAME" field in the document-related data RK indicates a name of a user (a user name) relating to the document file DF. It can be appropriately determined which user is associated with a document file DF, depending on the overall application of the data sharing system DKS or the application of each document file DF. For example, the "USER NAME" field may indicate a user name of each user who engages in work in which the document file DF needs to be used. Instead, it may indicate a user name of each user who has an access right to the document file DF. Differently, it may indicate a user name of a creator or an owner of the document file DF. It is also possible to associate a plurality of users with one document file DF.

The "BOX DIRECTORY" field shows a location and a box name (i.e., a directory path name) of a box BX in which the document file DF is saved. The "FILE NAME" field indicates a file name of the document file DF.

The "NETWORK PATH TO RELATED DOCUMENT" field represents identification information (i.e., a so-called network path) of the image processing apparatus 1 and a box BX that are storage locations of a document file DF of other document. The other document relates to the document of the document file DF specified in the "file name" field. The "RELATED DOCUMENT FILE NAME" field indicates a file name of the document file DF of the other document.

In some cases, a plurality of other documents is associated with one document. In other cases, no documents are associated with one document. Accordingly, a plurality of pieces of document-related data RK is given for one document file DF in some cases and no document-related data RK is given therefor in other cases. The document-related data RK is obtained by the related information obtaining portion 121 described below.

Referring back to FIG. 3, the related information obtaining portion 121 performs processing for obtaining information on a document file DF of other document associated with a document of a document file DF to register, based on the information thus obtained, document-related data RK of the document file DF in the file associated information database 132. Such information is obtained and registered, for example, according to the following procedure.

A document file DF to be processed is called from a box BX. The description about other document file DF, especially, the description about a storage location (a network path) and a file name of the other document file DF are searched from the document file DF thus called. When such description can be searched, document-related data RK is generated based on a user name of a user relating to the other document file DF and a storage location and a file name of the document file DF, all of which are indicated in the description mentioned above or a header of the other document file DF. Then, the generated document-related data RK is registered in the file associated information database 132. In the case where descriptions about a plurality of other document files DF are found, document-related data RK is generated and registered for each document file DF.

Note that information for associating a document file DF with a user may be written into a header or a footer of the document file DF and may be managed by an operating system.

Instead, a structure may be adopted in which a user or an administrator can enter some or all of information included in the document-related data RK.

The user authentication portion 123 determines whether or not a user who intends to login to the image processing apparatus 1 is an authentic user. In short, the user authentication portion 123 performs a user authentication process. The process may be performed by so-called password authentication or by using biometrics technology such as fingerprint authentication. A user who has been authenticated as an authentic user can login to the image processing apparatus 1 and use the same until he/she logs out of the same. Hereinafter, a user who is authenticated by the user authentication portion 123 and logs into the image processing apparatus 1 is referred to as a "login user".

The user associated table creating portion 122 generates a user associated table TB0 that is a list of document files DF relating to the login user according to the following procedure.

The user associated table creating portion 122 searches document files DF relating to the login user based on the document-related data RK (see FIG. 7) stored in the file associated information database 132 of the image processing apparatus 1 itself. Stated differently, the user associated table creating portion 122 searches document files DF relating to the login user from local boxes BX. The presence or absence of the relationship between a document file DF and the login user can be confirmed by checking whether or not a user name of the login user is indicated in the "USER NAME" field of the document-related data RK of the document file DF.

Further, the user associated table creating portion 122 downloads document-related data RK included in other image processing apparatus 1. Then, the user associated table creating portion 122 searches, based on the document-related data RK thus downloaded, document files DF relating to the login user from boxes BX of the other image processing apparatus 1.

After that, the user associated table creating portion 122 generates a user associated table TB0 that has contents as shown in FIG. 8 and indicates file names and storage locations of document files DF searched from the boxes BX of the image processing apparatus 1 and from the boxes BX of the other image processing apparatus 1.

The RSS data obtaining portion 125 obtains RSS data indicating updated contents of each of the document files DF specified in the user associated table TB0 generated by the user associated table creating portion 122.

More specifically, in the case where the document file DF is saved in a box BX of the image processing apparatus 1, the RSS data obtaining portion 125 obtains file update data Dt relating to an update of the document file DF from the update information file KF (see FIG. 6) saved in the RSS data accumulating portion 131 of the image processing apparatus 1.

In contrast, in the case where the document file DF is saved in a box BX of the other image processing apparatus 1, the RSS data obtaining portion 125 downloads the update detailed data Dk saved in the RSS data accumulating portion 131 of the other image processing apparatus 1 and obtains file update data Dt relating to an update of the document file DF from the update detailed data Dk thus downloaded.

The update information table creating portion 124 generates, according to the procedure described below, an update information table TB1 as shown in FIG. 9, i.e., a list of document files DF that relate to the login user and have ever been updated before.

The update information table creating portion 124 selects only document files DF whose corresponding file update data Dt are obtained by the RSS data obtaining portion 125 from the user associated table TB0 for the login user that is generated by the user associated table creating portion 122. Stated differently, the update information table creating portion 124 excludes document files DF whose file update data Dt are not obtained.

Then, the file update data Dt of the selected document files DF are organized in a predetermined format, e.g., a Comma Separated Value (CSV) format, so that the update information table TB1 as shown in FIG. 9 is generated.

A login user can make the image processing apparatus 1 generate an update information table TB1 indicating only document files DF that satisfy conditions specified by the login user. In such a case, the update information table creating portion 124 modifies the update information table TB1 that is generated according to the method described above by keeping information on updated contents relating to the document files DF that satisfy the conditions and by deleting information on updated contents relating to document files DF that do not satisfy the conditions.

Suppose, for example, that a login user specifies the conditions of being saved in a box BX named "model A specifications BOX". Responding to this, the update information table creating portion 124 modifies the update information table TB1 as shown in FIG. 10A by keeping only information on updated contents of document files DF saved in the box BX and by deleting information on updated contents of document files DF other than the document files DF saved in the box BX. As to a storage location of each of the document files DF, reference is desirably made to the file update data Dt in the document-related data RK saved in the RSS data accumulating portion 131 of the image processing apparatus 1 itself and to the file update data Dt in the document-related data RK downloaded from other image processing apparatus 1.

Suppose, for example, that a login user specifies the conditions of being associated with a document file DF named "specificationsA0.pdf". Responding to this, the update information table creating portion 124 modifies the update information table TB1 as shown in FIG. 10B by keeping only information on updated contents of document files DF associated with the document file DF named "specifications A0.pdf" and by deleting information on updated contents of document files DF other than the document files DF associated with the document file DF named "specifications A0.pdf". The modification is made based on the user associated table TB0 saved in the file associated information database 132 of the image processing apparatus 1 itself or based on the user associated table TB0 downloaded from other image processing apparatus 1.

The update information displaying portion 126 performs processing for displaying on the console panel log contents of the update information table TB1 that is generated by the update information table creating portion 124 and is modified as the need arises. As shown in FIGS. 9, 10A and 10B, since the update information table TB1 itself is CSV data or others, a chart as shown in FIG. 11 is desirably generated and displayed.

The update information displaying portion 126 may update and redisplay a chart appropriately based on the update information table TB1 that is modified by the update information table creating portion 124 every time a user specifies conditions as described above. For example, at first, the chart may be displayed based on the update information table TB1 having contents as shown in FIG. 9. Then, every time the update information table creating portion 124 modifies the update information table TB1, the update information table TB1 may be modified as shown in FIGS. 10A and 10B and the chart may be redisplayed.

The following is a description, with reference to flowcharts, of the entire processing flow concerning update information of a document file DF in the image processing apparatus 1. Hereinafter, the processing flow will be described, in particular, with the image processing apparatus 1A noted.

Figure 12:
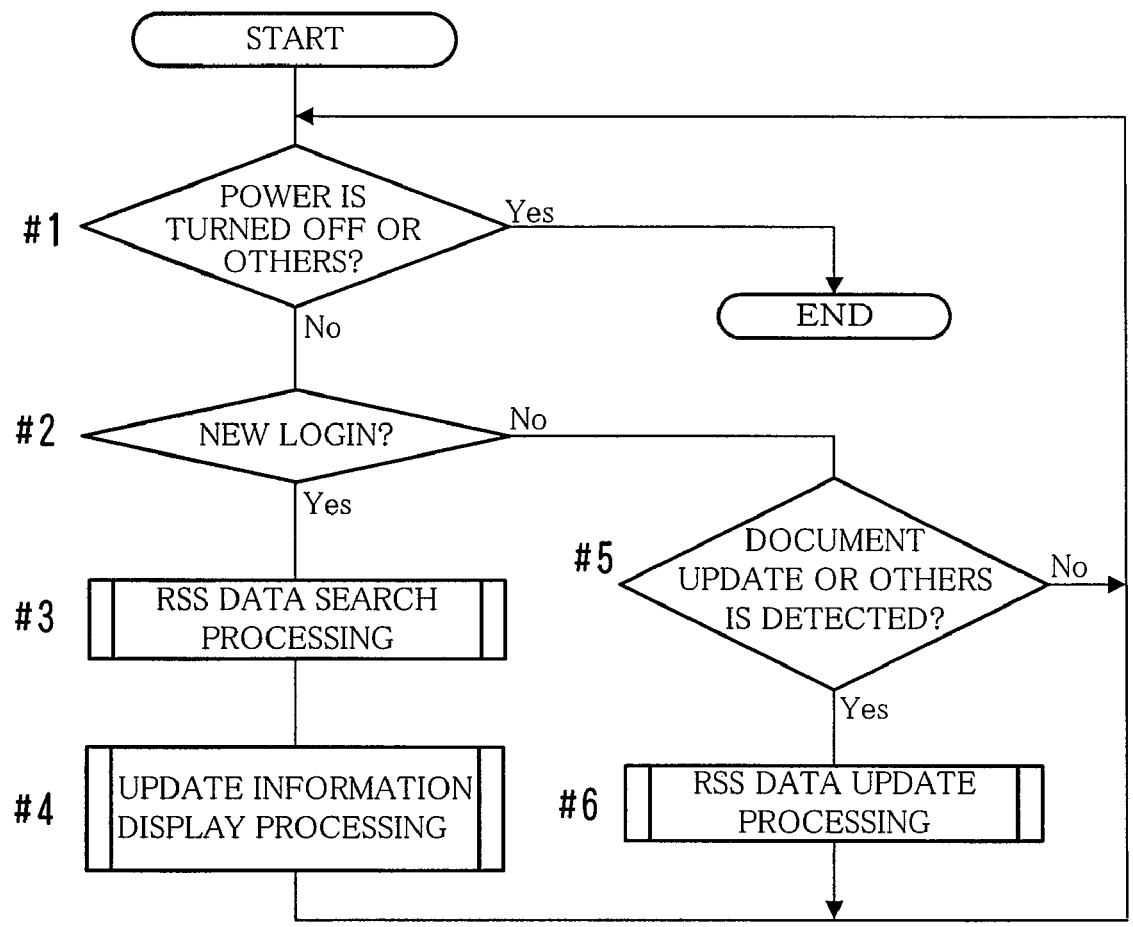
FIG. 12 is a flowchart showing an example of the entire processing flow in the image processing apparatus.

Referring to FIG. 12, the image processing apparatus 1A performs processing of Steps #3, #4 and #6 appropriately until the image processing apparatus 1A finishes providing service regarding update information, e.g., until it is turned off.

Specifically, in the case where a user newly logs into the image processing apparatus 1A and performs operation for requesting information on an update of a document file DF (Yes in #2), the image processing apparatus 1A performs processing for presenting information on updated contents of a document file DF associated with the user, i.e., the login user in the following manner.

Figure 13:
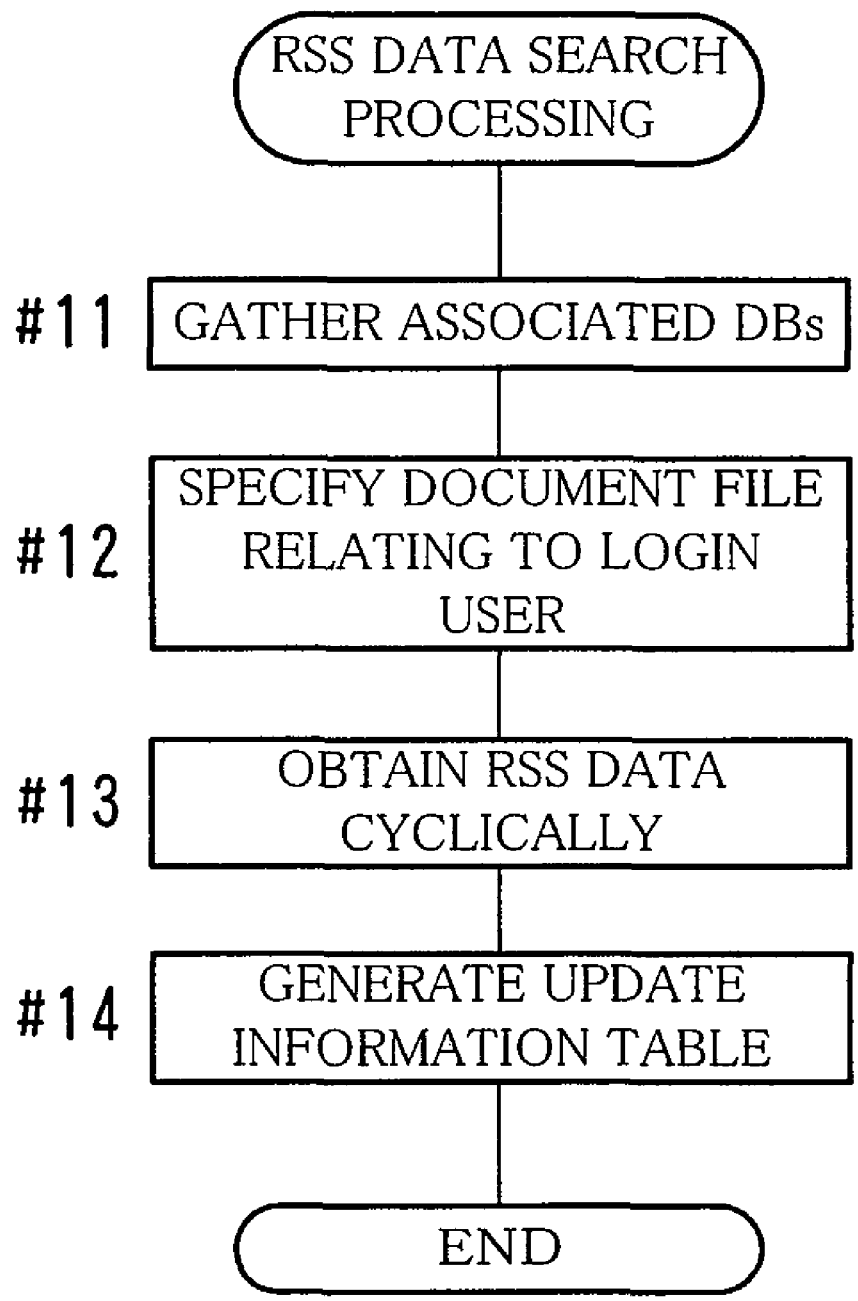
FIG. 13 is a flowchart showing an example of a flow of RSS data search processing.

The image processing apparatus 1A performs, according to the procedure shown in FIG. 13, processing for gathering data on document files DF saved in boxes BX of the image processing apparatus 1A itself or of other image processing apparatuses 1 (1B, 1C, . . . ) (#3).

The image processing apparatus 1A calls or downloads document-related data RK saved in the file associated information databases 132 (see FIG. 7) of the image processing apparatus 1A and the respective image processing apparatuses 1 (#11 in FIG. 13). Then, the image processing apparatus 1A specifies document files DF relating to the login user based on those pieces of the document-related data RK and generates a user associated table TB0 (see FIG. 8) indicating the document files DF (#12).

The image processing apparatus 1A obtains an update information file KF from the image processing apparatus 1 in which the document files DF specified in the user associated table TB0 are saved and obtains file update data Dt of the document files DF from the update information file KF (#13).

Then, based on the file update data Dt thus obtained, the image processing apparatus 1A generates an update information table TB1 (see FIG. 9) indicating document files DF that are associated with the login user and have ever been updated before (#14).

Figure 14:
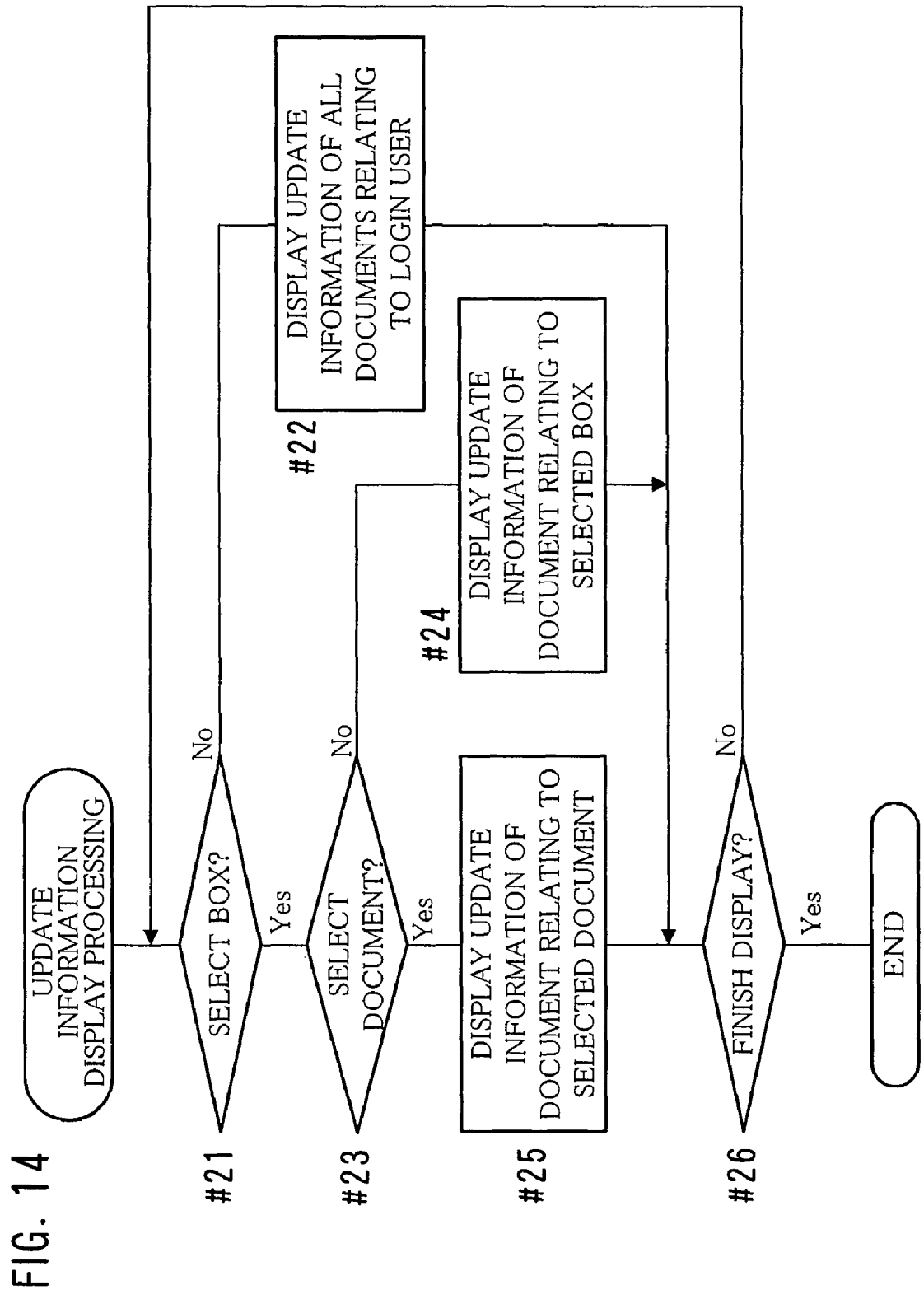
FIG. 14 is a flowchart showing an example of a flow of update information display processing.

Referring back to FIG. 12, based on conditions specified by the login user as needed, the image processing apparatus 1A performs processing for displaying updated contents of the document files DF relating to the login user according to the procedure shown in FIG. 14 (#4).

In the case where the login user specifies no conditions (No in #21 shown in FIG. 14), the image processing apparatus 1A displays, in the form of a chart as shown in FIG. 11, information on updated contents of all the document files DF indicated in the update information table TB1, i.e., information on updated contents of all the document files DF relating to the login user (#22).

In the case where the user designates conditions of being saved in a predetermined box BX (Yes in #21, No in #23), the image processing apparatus 1A displays only information on updated contents of document files DF saved in the predetermined box BX (#24). In the case where the user designates conditions of being related to a predetermined document file DF saved in a predetermined box BX (Yes in #21, Yes in #23), the image processing apparatus 1A displays only information on updated contents of a document file DF relating to the predetermined document file DF (#25). Every time the user changes the contents of designation, the image processing apparatus 1A starts the processing again from Step #21 through Step #25 appropriately until the display mode is finished.

Referring back to FIG. 12, when detecting that the contents of a document file DF saved in a box BX provided in the image processing apparatus 1A are updated (Yes in #5), the image processing apparatus 1A updates an update information file KF included therein according to the procedure shown in FIG. 15 (#6).

The image processing apparatus 1A transmits an electronic mail for requesting a report of the updated contents to a person who has updated the document file DF whose update has been detected (#31 in FIG. 15). When receiving a reply within a predetermined period of time after the transmission (Yes in #32), the image processing apparatus 1A determines which document file DF relates to the reply (#33) and extracts text data indicating the updated contents (#34).

If the text data can be extracted (Yes in #35), then the image processing apparatus 1A generates file update data Dt based on the text data and adds the file update data Dt to update detailed data Dk corresponding to the document file DF determined in Step #33 (#36).

In contrast, in the case where no reply is received within the predetermined period of time or where a reply includes no text data indicating the updated contents (No in #32 or No in #35), the image processing apparatus 1A resends an electronic mail for requesting a report on the updated contents (#37).

According to the embodiments described above, in the case where a document file DF shared by a plurality of users is updated, information on the update is not immediately sent to all the users in an indiscriminate manner. Instead, the information is temporarily recorded in an update information file KF. Then, when a user logs into the image processing apparatus 1, only information on an update of a document file DF relating to the user is presented to the user. Thus, it is possible for users to handle information on updates in a more efficient and easy way than ever before.

In the embodiments described above, in the case where a user logs into the image processing apparatus 1, information on an update relating to a document file DF that has ever been updated before is presented without limiting the time when the update was performed. Instead, however, such limitation may be provided. For example, it is possible to present only information on an update relating to a document file DF that was updated during the past one month. Differently, it is possible to present only information on an update relating to a document file DF that was updated during a period from the date and time of the previous logging in to the date and time of this logging in. Instead, a structure is possible in which a user can specify a period.

In the embodiments described above, information on an update of a document file DF relating to a user who has logged in is presented. Instead, a structure is possible in which information on an update of a document file DF relating to other user can be selectively presented.

In the embodiments, the description is provided of the case where information on updates of document files DF saved in the image processing apparatus 1 is to be handled. However, it is possible to handle information on updates of document files DF saved in the box document management server 2 or the terminal 3 in the same manner.

In the embodiments described above, the overall configuration of the data sharing system DKS and the image processing apparatus 1, the configurations of various portions thereof, the details of processing, the processing order, the structures of the user associated table TB0, the update information table TB1, the update information file KF, and the like may be changed as needed, in accordance with the subject matter of the present invention.

As discussed above, the invention according to independent claims of the present application can be embodied. Note that the embodiments described above also indicate image processing apparatuses in which the following features are incorporated into the image processing apparatus defined in claim 1.

The image processing apparatus further includes an entry request portion that requests a user who has updated the shared data to enter information on the update of the shared data whose update has been detected by the updated data detection portion. The update information storage portion stores, as the update information of the shared data, information including contents of the shared data, the contents being entered by the user.

The entry request portion requests entry of the information on the update of the shared data by sending an electronic mail.

The image processing apparatus further includes a user associated information storage portion that stores user associated information indicating which user relates to the shared data. The update information presenting portion presents the update information of the shared data relating to a user who has been logging into the image processing apparatus based on the user associated information stored in the user associated information storage portion.

The image processing apparatus further includes a shared data associated information storage portion that stores shared data associated information indicating which of the other shared data relates to the shared data. The update information presenting portion presents the update information of the other shared data relating to the shared data specified by a user based on the shared data associated information stored in the shared data associated information storage portion.

The image processing apparatus further includes an associated shared data determination portion that determines which of the other shared data relates to the shared data by searching a data name specified in the shared data. The shared data associated information storage portion stores, as the shared data associated information, information including a determination result in the associated shared data determination portion.

The shared data saving portion is provided with a plurality of directories for classifying the shared data. The update information presenting portion presents the update information of the shared data saved in the directory specified by a user.

The image processing apparatus further includes an update information obtaining portion that obtains the update information of the shared data saved in other image processing apparatus. The update information presenting portion presents the update information of the shared data saved in the shared data saving portion of the image processing apparatus or saved in other image processing apparatus.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image processing apparatus comprising:
    a shared data saving portion that saves shared data that can be shared by a plurality of users;
    an updated data detection portion comprising a processor that detects updated shared data among the shared data saved in the shared data saving portion;
    an update information obtaining portion that obtains update information of the shared data detected by the updated data detecting portion, indicating identification information of the shared data, a date and time when the update has been performed, a user who has performed the update and updated contents, by determining a difference between contents or attributes of the shared data before and after the update, or by receiving updated contents reported by a user who has performed the update;
    an update information storage portion that stores update information obtained by the update information obtaining portion; and
    an update information presenting portion that presents a user with the update information of the shared data satisfying conditions.

2. An image processing apparatus comprising:
a shared data saving portion that saves shared data that can be shared by a plurality of users;
an updated data detection portion comprising a processor that detects updated shared data among the shared data saved in the shared data saving portion;
an entry request portion that requests a user who has updated the shared data to enter information on the update of the shared data whose update has been detected by the updated data detection portion;
an update information storage portion that stores update information indicating identification information of the shared data whose update has been detected by the updated data detection portion, a date and time when the update has been performed, a user who has performed the update, updated contents, and information including contents of the shared data entered by the user; and
an update information presenting portion that presents a user with the update information of the shared data satisfying conditions.

3. The image processing apparatus according to claim 2, wherein the entry request portion requests entry of the information on the update of the shared data by sending an electronic mail.

4. An image processing apparatus comprising:
a shared data saving portion that saves shared data that can be shared by a plurality of users;
a user associated information storage portion that stores user associated information indicating which user relates to the shared data;
an updated data detection portion comprising a processor that detects updated shared data among the shared data saved in the shared data saving portion;
an update information storage portion that stores update information indicating identification information of the shared data whose update has been detected by the updated data detection portion, a date and time when the update has been performed, a user who has performed the update and updated contents; and
an update information presenting portion that presents a user with the update information of the shared data relating to a user who has been logging into the image processing apparatus based on the user associated information stored in the user associated information storage portion.

5. An image processing apparatus comprising: a shared data saving portion that saves shared data that can be shared by a plurality of users;
a shared data associated information storage portion that stores shared data associated information indicating which of the other shared data relates to the shared data;
an updated data detection portion comprising a processor that detects updated shared data among the shared data saved in the shared data saving portion;
an update information storage portion that stores update information indicating identification information of the shared data whose update has been detected by the updated data detection portion, a date and time when the update has been performed, a user who has performed the update and updated contents; and
an update information presenting portion that presents a user with the update information of the shared data relating to the shared data specified by a user based on the shared data associated information stored in the shared data associated information storage portion.

6. The image processing apparatus according to claim 5, further comprising an associated shared data determination portion that determines which of the other shared data relates to the shared data by searching a data name specified in the shared data, wherein the shared data associated information storage portion stores, as the shared data associated information, information including a determination result in the associated shared data determination portion.

7. An image processing apparatus comprising:
a shared data saving portion that saves shared data that can be shared by a plurality of users;
an updated data detection portion comprising a processor that detects updated shared data among the shared data saved in the shared data saving portion;
an update information storage portion that stores update information indicating identification information of the shared data whose update has been detected by the updated data detection portion, a date and time when the update has been performed, a user who has performed the update and updated contents; and
an update information presenting portion that presents a user with the update information of the shared data satisfying conditions,
wherein the shared data saving portion is provided with a plurality of directories for classifying the shared data, and the update information presenting portion presents the update information of the shared data saved in the directory specified by a user.

8. An image processing apparatus comprising:
a shared data saving portion that saves shared data that can be shared by a plurality of users;
an updated data detection portion comprising a processor that detects updated shared data among the shared data saved in the shared data saving portion;
an update information storage portion that stores update information indicating identification information of the shared data whose update has been detected by the updated data detection portion, a date and time when the update has been performed, a user who has performed the update and updated contents;
an update information obtaining portion that obtains the update information of the shared data saved in other image processing apparatus;
an update information presenting portion that presents a user with the update information of the shared data satisfying conditions, and the update information presenting portion presents the update information of the shared data saved in the shared data saving portion of the image processing apparatus or saved in other image processing apparatus.

9. An image processing system comprising:
a shared data saving portion that saves shared data that can be shared by a plurality of users;
an updated data detection portion comprising a processor that detects updated shared data among the shared data saved in the shared data saving portion;
an update information obtaining portion that obtains update information of the shared data detected by the updated data detecting portion, indicating identification information of the shared data, a date and time when the update has been performed, a user who has performed the update and updated contents, by determining a difference between contents or attributes of the shared data before and after the update, or by receiving updated contents reported by a user who has performed the update;
an update information storage portion that stores update information obtained by the update information obtaining portion; and an update information presenting portion that presents a user with the update information of the shared data satisfying conditions.

10. A method for managing data in an image processing apparatus, the method comprising:
saving, by a shared data saving portion, shared data that can be shared by a plurality of users;
detecting updated shared data among the shared data saved in the shared data saving portion utilizing a processor;
obtaining update information, by an update information obtaining portion, of the detected shared data, indicating identification information of the shared data, a date and time when the update has been performed, a user who has performed the update and updated contents, by determining a difference between contents or attributes of the shared data before and after the update, or by receiving updated contents reported by a user who has performed the update;
storing, by an update information storage portion, update information obtained by the update information obtaining portion; and
presenting a user with the update information of the shared data satisfying conditions.

11. A non-transitory computer readable medium storing a computer program used in an image processing apparatus including a shared data saving portion that saves shared data that can be shared by a plurality of users, the computer program letting the image processing apparatus perform the steps of:
detecting updated shared data among the shared data saved in the shared data saving portion utilizing a processor;
obtaining update information, by an update information obtaining portion, of the detected shared data, indicating identification information of the shared data, a date and time when the update has been performed, a user who has performed the update and updated contents, by determining a difference between contents or attributes of the shared data before and after the update, or by receiving updated contents reported by a user who has performed the update;
storing, by an update information storage portion, update information obtained by the update information obtaining portion; and
presenting a user with the update information of the shared data satisfying conditions.

* * * * *